United States Patent [19]

Cassidy

[11] Patent Number: 4,645,865
[45] Date of Patent: Feb. 24, 1987

[54] HIGH TEMPERATURE PROTECTION SLEEVE

[75] Inventor: John E. Cassidy, Churchville, Pa.

[73] Assignee: Electro Nite Co., Philadelphia, Pa.

[21] Appl. No.: 626,498

[22] Filed: Jun. 29, 1984

[51] Int. Cl.$^4$ ............................................. H01L 35/02
[52] U.S. Cl. ..................................................... 136/234
[58] Field of Search ................................ 136/230–234

[56] References Cited

U.S. PATENT DOCUMENTS

| | | | |
|---|---|---|---|
| 2,493,078 | 1/1950 | Mead | 136/234 |
| 3,374,122 | 3/1968 | Cole | 136/234 |
| 3,698,954 | 10/1972 | Jones et al. | 136/234 |
| 3,816,183 | 6/1974 | Kraus | 136/234 |
| 3,818,762 | 6/1974 | Kraus et al. | 136/234 |
| 4,179,309 | 12/1979 | Hance et al. | 136/234 |
| 4,229,230 | 10/1980 | Hance | 136/234 |
| 4,396,792 | 8/1983 | Falk | 136/234 |
| 4,521,639 | 6/1985 | Falk | 136/234 |

Primary Examiner—John F. Terapane
Assistant Examiner—T. J. Wallen
Attorney, Agent, or Firm—Seidel, Gonda, Goldhammer & Abbott

[57] ABSTRACT

A preformed refractory sleeve for a temperature sensing device suitable for repeated immersions into molten metal is generally cylindrical in shape. An inwardly directed shoulder is spaced from the immersion end of the sleeve against which shoulder a support tube supporting the temperature sensor may abut and seal. The bore of the sleeve includes a truncated cone-shaped recess between the shoulder and the immersion end of the sleeve through which the bight of the temperature sensor extends. The truncated cone-shaped recess is filled with refractory cement to positively secure the temperature sensor to the sleeve and insulate the temperature sensor. Longitudinal ribs may extend into the bore of the cylindrical sleeve at the end of the sleeve opposite the truncated cone-shaped bore to center the support tube and form insulating air gaps between the sleeve and support tube.

8 Claims, 3 Drawing Figures

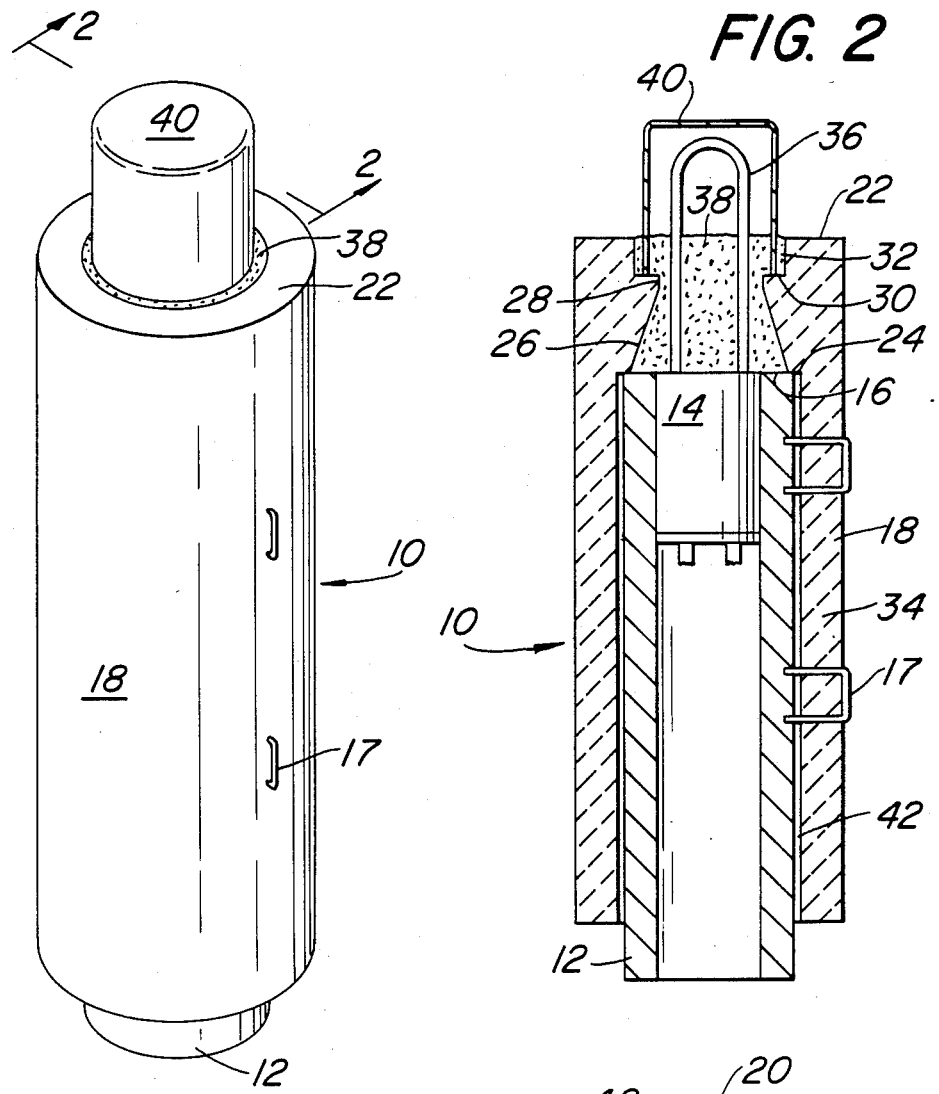
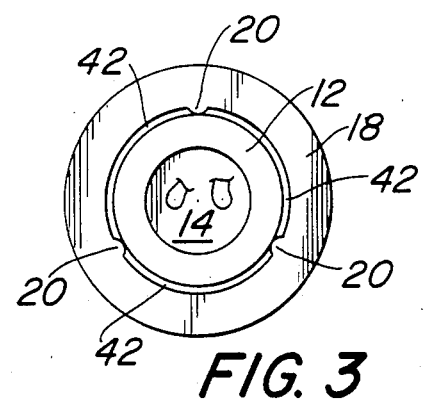

4,645,865

HIGH TEMPERATURE PROTECTION SLEEVE

BACKGROUND OF THE INVENTION

1. Field of the Invention

This invention relates generally to high temperature protection tubes, and more particularly concerns a preformed refractory sleeve for a temperature sensing device suitable for repeated immersions into molten metal.

2. Prior Art

As shown by Kraus, U.S. Pat. No. 3,816,183 it is known to surround a support tube and thermocouple unit of a temperature sensing device for repeated immersion into molten metal with a cylindrical sleeve of refractory material. However, due to the cylindrical shape of the sleeve, the relative position of the support tube and therefore the thermocouple unit within the sleeve cannot be controlled with certainty. Therefore, a measuring step is required to control the extent to which thermocouple unit hot junction projects beyond the refractory cement which is applied over the end face of the thermocouple body.

OBJECT OF THE INVENTION

A principle object of the present invention is to provide a preformed sleeve for a temperature sensing device suitable for immersion into molten metal which provides a positive stop and seal between the support tube and the preformed sleeve whereby the measuring step is eliminated and uniformity is attained.

A further object is to provide such a sleeve which provides more insulation for the thermocouple unit to permit use of less refractory cement. Since the refractory sleeve is a better insulator than the refractory cement, the thermocouple unit may be embedded in the sleeve to a shallower depth.

A still further object is to provide such a sleeve with integral means to center the support tube and create a gap between the sleeve and support tube.

Yet another object is to provide such a sleeve to which the refractory cement can be positively secured.

Another object is to provide such a sleeve which permits use of a smaller metal cap.

SUMMARY OF THE INVENTION

In accordance with the present invention, the preformed refractory sleeve includes one end portion having a generally cylindrical bore terminating at an inwardly projecting shoulder and a portion adjacent to the one end portion forming a bore having a generally truncated coneshape. The support tube surrounding the thermocouple unit is inserted into the cylindrical bore unit the end face of the support tube abuts the shoulder with the hot junction of the thermocouple extending a predetermined distance beyond the opposite end of the sleeve. The refractory sleeve is secured to the support tube and the truncated cone-shaped cavity at the top of the sleeve is filled with refractory cement.

The end of the tube adjacent to the hot junction may have a generally cylindrical bore with a diameter greater than the minimum diameter of the truncated cone-shaped bore so that a second shoulder is formed at the juncture of the cylindrical bore and the truncated cone-shaped bore. A closed end cylindrical metal cap may be inserted over the hot juncture with the open end abutting the second shoulder to protect the hot junction.

Longitudinal ribs extending generally parallel to the axis of the first-mentioned cylindrical bore may be formed on the wall of the first-mentioned cylindrical bore. When the support tube is inserted into the sleeve, the ridges center the support tube within the sleeve and form air gaps which improve the thermal insulation properties of the sleeve.

Other objects and advantages will appear hereinafter.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is a perspective view of the immersion end of a temperature sensing device in accordance with the present invention.

FIG. 2 is a section view taken along the line 2—2 in FIG. 1.

FIG. 3 is a bottom plan view of the temperature measuring device of FIG. 1.

DETAILED DESCRIPTION OF THE INVENTION

Referring to the drawing wherein like numerals indicate like elements, there is shown in FIG. 1 a temperature sensing device 10 adapted to be mounted on the immersion end of a lance. Device 10 is designed for repeated immersion in molten metal such as steel and iron.

The device 10 includes a support tube 12 of paperborad or the like. The body 14 of a temperature sensor is joined to the inner periphery of tube 12, preferably by an adhesive such as polyvinyl alcohol, adjacent immersion end 16 on tube 12. Body 14, within tube 12, has contacts adapted to mate with contacts on the lance. Tube 12 is surrounded by and joined to a protection sleeve 18. The joining of sleeve 18 at tube 12 is preferably by staples 17.

Sleeve 18 is preferably vacuum cast from fine refractory fibers such as ceramic fibers as disclsoed in U.S. Pat. No. 3,816,183. The disclsoure in said patent is incorporated herein by reference. The preferred density of the sleeve 18 is 22-28 lbs/ft$^3$ and the preferred wall thickness for the cylindrical portion 34 is 0.31 inches. Sleeve 18 has a coefficient of thermal conductivity of 0.5-1.6 BTU in/°F.-hr ft$^2$.

Sleeve 18 is preferably provided with a plurality of axially extending ribs or ridges 20 on its inner periphery. As shown in FIG. 3, there are 3 ridges which are equally spaced apart by about 120° on the inner periphery of sleeve 18.

The outer periphery of sleeve 18 is smooth. Adjacent the immersion end 22 of sleeve 18 there is provided a radially inwardly directed shoulder 24 on the inner periphery. Shoulder 24 is spaced from end 22 by a predetermined distance such as 0.875 inches. Between shoulder 24 and end 22, the inner periphery of sleeve 18 has a surface 26 which tapers inwardly to an axial surface 28. A shoulder 30 on a radial surface intersects surface 28. Shoulder 30 is the bottom surface of a recess whose axial surface 32 has a diameter less than the inner diameter of the cylindrical portion 34 of sleeve 18.

The body 14 supports a temperature sensor such as a thermocouple having its hot junction within the bight of a U-shaped protective sleeve 36. Sleeve 36 has its bight beyond end 22 with its legs extending through the bore defined by surface 26 which defines a truncated cone. The truncated cone and recess are coextensive and filled with a refractory cement 38. A cup-shaped protective cap 40 has its open portion end immersed in cement 38 and rests on shoulder 30.

Assembly of device 10 requires minimal judgment and measurement. Body 14 is adhesively joined to the inner periphery of tube 12 with an end face flush with end 16. Sleeve 18 is telescoped over tube 12 until end 16 abuts shoulder 24. Then staples 17 are applied. The hot junction in the bight of sleeve 36 is now automatically spaced from end 22 by a predetermined distance such as 11/16 inches. Cement 38 is applied and permitted to cure. Before cement 38 cures, cap 38 is immersed into cement 38 until its open abuts shoulder 30.

The shape of the space containing cement 38 results in a more positive locking of cement 38 to the sleeve 18 while using less cement. The ridges 20 contact the outer periphery of tube 12 whereby air gaps 42 are provided. Air gaps 42 cooperate with sleeve 18 to provide better insulation. Sleeve 18 is inert whereby device 10 is a non-splash device. The unique construction of device is believed to be the reason for initial tests results whereby the operating life is up to 50% longer than prior art devices.

The present invention may be embodied in other specific forms without departing from the spirit or essential attributes thereof and, accordingly, reference should be made to the appended claims, rather than to the foregoing specification, as indicating the scope of the invention.

I claim:

1. A sleeve for a repeating temperature sensing immersion probe, the sleeve supporting a temperature sensing device in a predetermined projecting relationship beyond the end of the probe, the sleeve comprising: a generally inert refractory sleeve for surrounding the temperature sensing device having an open end and an immersion end, the wall of the sleeve forming a cylindrical bore extending inwardly from said open end, an inwardly projecting shoulder formed at the opposite end of said cylindrical bore from said open end, a truncated cone shaped bore in axial alignement with said cylindrical bore, the base of said cone being adjacent to said shoulder, the opposite end of said cone from said base positioned adjacent to the immersion end of said sleeve, said shoulder forming a support for the body of the temperature sensing device with the sleeve such that the hot junction of the device projects through said cone shaped bore and beyond said immersion end of said sleeve by a predetermined relationship.

2. The sleeve according to claim 1 wherein the wall of said sleeve at the immersion end forms a second cylindrical bore in axial alignment with the first mentioned cylindrical bore and said cone shaped bore, said second cylindrical bore having a diameter greater than the minimum diameter of said cone shaped bore, the wall of said sleeve at the juncture of the second cylindrical bore and cone shaped bore forming a second inwardly projecting shoulder.

3. The sleeve according to claim 1 wherein the cone shaped bore has a maximum diameter less than the diameter of the first mentioned cylindrical bore, the shoulder being formed by the juncture of the cone shaped bore and the cylindrical bore.

4. The sleeve according to claim 1 wherein the wall portion forming the first mentioned cylindrical bore has a plurality of linear ridges projecting into said bore, said ridges extending axially along said internal wall of said sleeve, said ridges contacting the temperature sensing device contacting the exterior of the temperature sensing device.

5. A sleeve in accordance with claim 1 further comprising a refractory cement surrounding a portion of the thermocouple projecting through said cone shaped bore and substantially filling the truncated cone shaped bore.

6. A sleeve in accordance with claim 2 further comprising a refractory cement surrounding the portion of the thermocouple device projecting through said truncated cone shaped bore and substantially filling said cone shaped and said second cylindrical bore.

7. A sleeve in accordance with claim 6 further comprising a cup shaped cap having its open end within said cement, said open end of said cap contacting the radial surface on the second inwardly projecting sleeve.

8. A repeating temperature sensing immersion probe comprising: a generally cylindrical support tube having an axial bore therethrough; a temperature sensing device having a body member and a thermocouple hot junction extending from the body member, the body member positioned within the axial bore of the support tube such that the end of the support tube and the top of the body member adjacent the hot junction projection are substantially coplaner; a sleeve made of a generally inert refractory material for surrounding the support tube and the temperature sensing device, the sleeve having an open end and an immersion end, the sleeve having a cylindrical bore extending inwardly from said open end, an inwardly projecting annular shoulder formed at the opposite end of the cylindrical bore for said open end, a truncated cone shaped bore in axial alignment with said cylindrical bore, the base of said cone being adjacent to said shoulder, the opposite end of said cone from said base positioned adjacent the immersion end of said sleeve, a second cylindrical bore formed from the immersion end of the sleeve and in axial alignment with the first mentioned cylindrical bore and said cone shaped bore, said second cylindrical bore having a diameter greater than the minimum diameter of said cone shaped bore and communicating with said cone shaped bore at a second inwardly projecting shoulder, said cylindircal bore adapted to receive said support tube and said temperature sensing device such that said support tube abuts against said shoulder forming a support for the body member such that the hot juncture of the device projects through said cone shaped bore and beyond the immersion end of said sleeve by a predetermined distance; a refractory cement filling said truncated cone shaped bore and said second cylindrical bore fixing the position of the temperature sensing device and the support tube within the refractory sleeve such that the projected end of the thermacouple device extends beyond the end of the refractory sleeve by a predetermined fixed amount.

* * * * *